Patented Nov. 4, 1924.

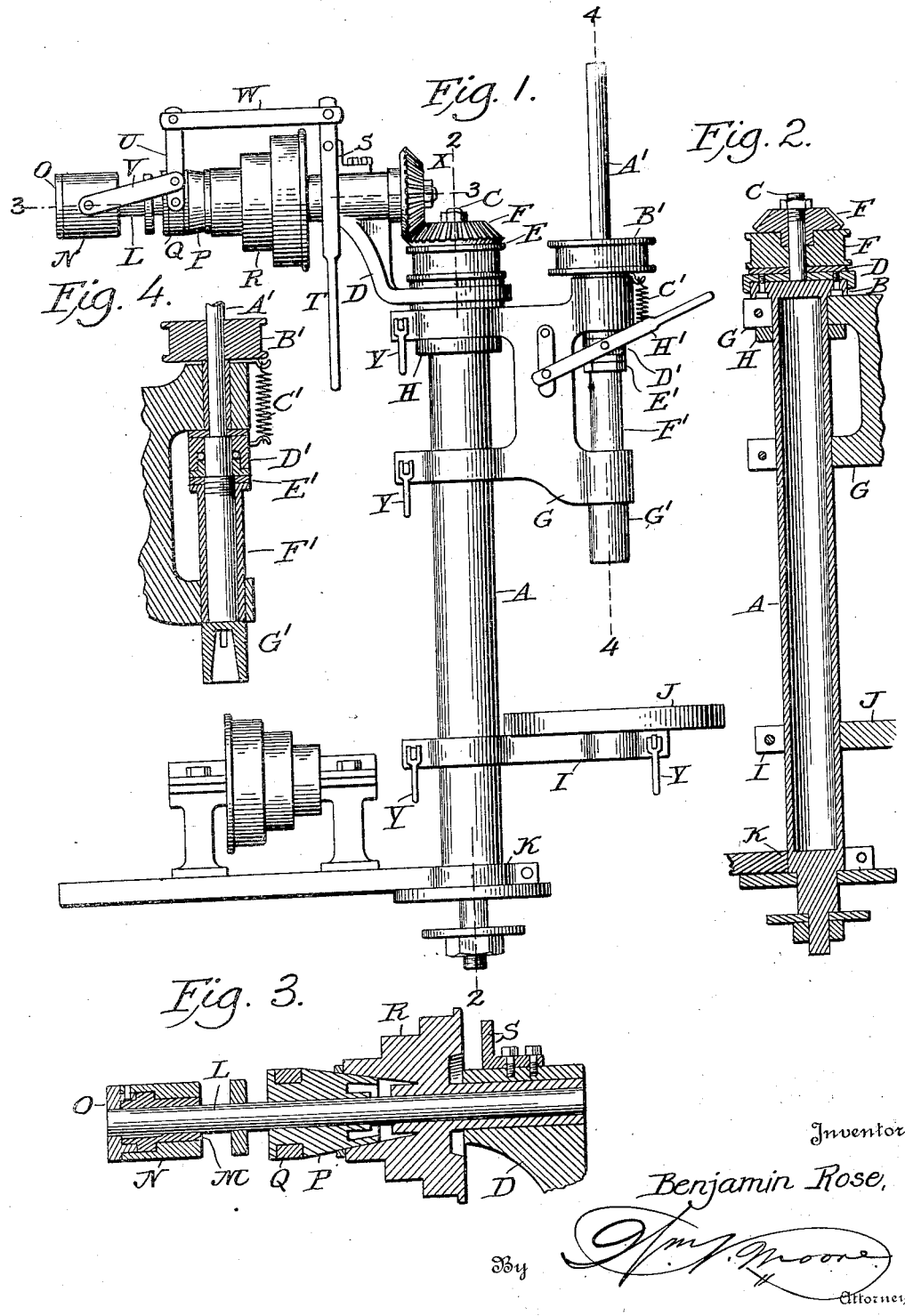

1,513,786

UNITED STATES PATENT OFFICE.

BENJAMIN ROSE, OF TITUSVILLE, PENNSYLVANIA.

PORTABLE DRILL PRESS.

Application filed April 30, 1921, Serial No. 465,744. Renewed March 20, 1924.

*To all whom it may concern:*

Be it known that I, BENJAMIN ROSE, a resident of Titusville, in the county of Crawford and State of Pennsylvania, a citizen of the United States, have invented certain new and useful Improvements in Portable Drill Presses, of which the following is a specification.

My invention relates to that class of drill presses, which are used in those lines of trade and manufacture, where technical accuracy is required in the boring and fitting of machine parts, utilities, and devices made of metal, rubber, wood, or composition of various textures.

The object of my invention is to provide a quick acting portable drill press combining quick adjustment of parts, instant control of power transmission, and drill feed attachments, radial adjustment of approximately 240° for drill feed attachment on horizontal plane, drill table being adjustable on horizontal plane to a like radius around supporting column and vertically adjustable for thickness of material, and an adaptability for alignment with line shafting in awkward position.

A further object of my invention is to generally improve this class of devices, so as to increase their utility, durability and efficiency.

Further objects and advantages will appear in the following description, it being understood that various changes in form, proportions and minor details of construction may be resorted to within the scope of the appended claim.

In my improved quick acting portable drill press, I accomplish the objects set forth, by using in combination: a hollow wrought iron standard or supporting column having a heavy flange at the top end, and a solid wrought iron plug at the bottom end, both being welded to the tube forming the hollow supporting column aforesaid; the whole being machined to fit and hold the several parts in place when the machine is assembled. A cast iron bracket so shaped that the base forms a disc, having a recess in the under side of sufficient size to fit over the flange top end of supporting column, to which it is fastened by set screws, and having a smaller recess and hole in the center through which a flange spindle fitted to said disc extends, forming the shaft which transmits the power to the drill spindle, the arm of said bracket forms at the top a cylindrical bearing in which a bushing and the power drive shaft are fitted. The power drive is controlled by use of a cone pulley, having a friction clutch keyed to the drive shaft, so fitted and adjusted by means of a collar, and anchor sleeve attached to shaft, that the contact and release of power are controlled by means of two connecting rods attached to anchor sleeve at shaft end, extending to Y shaped lever, attached at equi-distant points to brass ring in which friction clutch revolves, connecting rod attached to Y shaped lever, extending to shifting lever, attached to bracket bolted on top of cylindrical bearing aforesaid; the leverage in the power control being so distributed that the maximum of power is applied by using a minimum of exertion. In many localities electric power is accessible and in growing demand; to meet which I prefer an additional adjustable arm attached to the supporting column of my invention, on which a cone pulley and small electric motor are furnished and fitted, connecting by means of small belt to cone friction clutch device; thereby making my invention more efficient, through having self contained power drive. The transmission of power is made by means of a bevel gear wheel fastened to the end of the drive shaft which meshes with gear wheel fitted to a flange pulley fastened to the flanged spindle in top of hollow supporting column connecting by means of small belt with flanged pulley fastened to attachment in swing arm supporting drill spindle. The drill feed controlling attachment mounted in the swing arm aforesaid combines the drill spindle driven by flange pulley having an extension on the underside extending through and connected to a washer underneath the upper arm of said swing arm, a ball bearing feed sleeve attached to the feed lever, and having a spiral spring attached extending to hook plate at top of swing arm, so adjusted that it insures instant release of drill, when in operation, and automatic return of feed lever to place; the adjustable lock nuts and sleeve drill sockets designed to minimize the friction and wear of parts.

In the drawings hereto attached and made part hereof: Figure 1, is a front view showing the general appearance of my improved quick acting portable drill press with the several parts assembled in position including arm which supports electric motor and cone pulley drive. Fig. 2, is a cross section view on the line 2—2, in Fig. 1, showing the method of assembling the several parts attached to the hollow column support. Fig. 3, is a cross section view on the line 3—3, in Fig. 1, showing the method of assembling the several parts attached to and forming the friction clutch power control. Fig. 4, is a cross section view on the line 4—4, in Fig. 1, showing the method of assembling the several parts attached to and forming the drill feed and controlling device.

Similar letters refer to similar parts throughout the several views.

The hollow column support A, has a flange B welded in the top end, the disc shaped base of cast iron bracket D, having a recess in the bottom fitted to flange spindle C, which forms shaft for power transmission to drill spindle, also having large recess fitted to receive flange B in top of column support A to which it is attached by set screws, flange pulley E, which transmits power to flange pulley $B^1$ attached to drill spindle, bevel gear wheel F, fitted to flange pulley E and held in place by nut and thread in top of flange spindle C, the relative position of split adjustable drill arm support G, collar H which forms additional support for same, split adjustable arm I which supports drill table J, adjustable split arm K on which electric motor and cone drive pulley are mounted, floor flange plate, washer and nut fitted to solid piece welded in bottom end of hollow column support A, to adjust the fasten drill press in position. See Fig. 1, and Fig. 2.

The friction clutch power control, having an anchor sleeve attached to end of drive shaft L, consisting of an inner flange sleeve M fastened to drive shaft L, an outer loose sleeve N held in place by a flanged cap O fastened in the end by set screws, collar fastened to drive shaft L to adjust motion required to bring into contact and release friction clutch, friction clutch cone pulley P which slides on a key fitted to drive shaft K, loose brass ring Q fitted between flanges on friction clutch pulley O, cone pulley R held in place by collar fastened to drive shaft K, bracket S to which shifting lever T is attached, bevel gear wheel X to transmit power to gear wheel F, for driving drill spindle, screw handles Y attached to split arm supports to facilitate adjustment, cast iron bracket D which supports friction clutch power control, and being fitted with bushing forms the bearing for drive shaft L Y shaped lever U fastened at equi-distant points to brass ring Q fitted between flanges on friction clutch pulley P, two connecting rods V fastened to anchor sleeve and extending and attached to Y lever U, connecting rod W attached to Y shaped lever U, and shifting lever T (see Fig. 1 and Fig. 3).

The drill feed and controlling device combining the drill spindle $A^1$, flange pulley $B^1$ by which power is transmitted, ball bearing feed sleeve $D^1$, spiral spring $C^1$ attached to hook plate resting on top of swing arm G and adjusted to ball bearing feed sleeve $D^1$ to automatically release drill and restore feed lever $H^1$ to position, when in use, lock nuts $E^1$ to adust ball bearing feed sleeve $D^1$, friction drill sleeve $F^1$, taper drill socket $G^1$, feed lever $H^1$.

I am aware that prior to my invention drill presses of the same or similar pattern as shown have been made and used. Therefore I do not claim such a combination broadly; but

I claim:

A portable drill press, comprising a cylindrical standard carrying near its top a lateral bracket mounting a horizontal shaft geared to a gear wheel mounted on the upper end of said standard and rigid with a pulley, in combination with a drill support or bracket having an upper and a lower split collar arm surrounding the standard and having means for clamping thereon; the standard having an end flange and a collar spaced therefrom between which the upper collar arm engages a drill spindle slidable and rotatable in a sleeve forming part of said support or bracket, and a pulley belted to the aforementioned pulley, and means for vertically sliding said spindle.

In testimony whereof I hereunto affix my signature.

BENJAMIN ROSE.